UNITED STATES PATENT OFFICE.

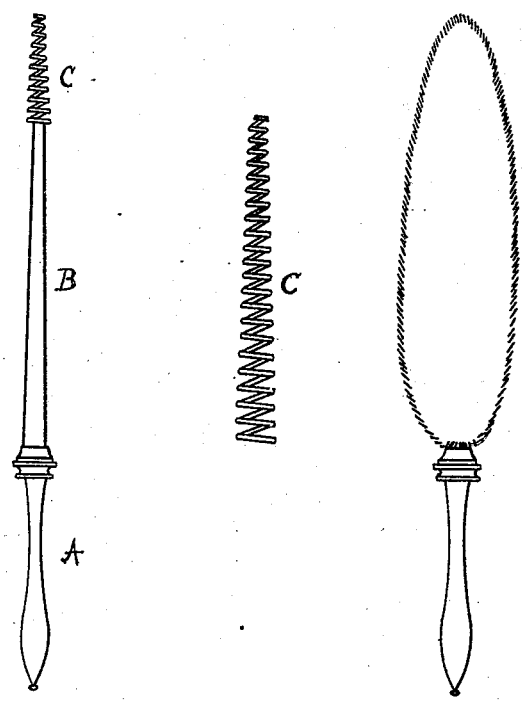

LAÛRITZ HOBOLTH, OF MONTREAL, QUEBEC, CANADA.

IMPROVEMENT IN DUSTING-BRUSHES.

Specification forming part of Letters Patent No. 183,458, dated October 17, 1876; application filed June 22, 1876.

*To all whom it may concern:*

Be it known that I, LAÛRITZ HOBOLTH, of the city of Montreal, in the district of Montreal and Province of Quebec, Dominion of Canada, furrier, have invented certain new and useful Improvements in Furniture-Dusters; and I do hereby declare the following to be a full, clear, and exact description of the same, reference being had to the accompanying drawing, and the letters of reference marked thereon, and which I desire to be taken as and form a part of this specification.

Figure 1 of the drawing represents the handle, core, and tip. Fig. 2 represents the tip; and Fig. 3 represents the duster when all the parts are in place.

The object of my invention is to provide a duster which will answer the requirements of any duster now in use, and yet do away with the possibility of scratching the furniture or whatever is being dusted. To accomplish this object I take a piece of wood of suitable size and turn or otherwise form the handle, (shown in Figure 1,) which includes the hand-piece A and the tapering core or shank B. Upon the end of the shank I place a tapering spiral spring, C, (more fully shown in Fig. 2,) fastening it securely in place, so that it may not come off in use. This shank or tip I insert in the tanned tail of an animal, drawing the skin close up to the ornamental bead of the handle, and nailing or otherwise securing it. The completed article is shown in Fig. 3.

The elastic tip to the core is not essential to my invention, though it adds to its value by making the duster less liable to injure fragile articles.

The tail is removed entire without splitting, and tanned with the hair on.

At present the tails of foxes, coons, and other animals having long hair, are sold at a merely nominal price, there being no commercial use made of them, and it is evident that they are particularly adapted to the use to which I put them, since, when drawn over a core, as I propose, they fit closely and evenly. There are no laps or joinings, as is the case when the core is covered by winding with strips of skins, and hence washing does not injure them, and their use fills a place heretofore unoccupied in household economy.

In dusting a chiffonier, on which there is a lot of carving, the point of my duster can be inserted into any crevice in the carving without fear of breaking or scratching, as the spring-tip will give to the opposing particle. It is also superior to any duster now in use, for it will clean away all dust without scattering it around on those articles already dusted. In fact, it can be used as a broom to sweep off anything from the surface of a table or any similar piece of furniture.

Another great feature of my duster is that it can be used as a lamp-glass cleaner, and should it get dirty at any time it can be washed and dried the same as a cloth can; and, as the inside is the skin of the animal, there is not the possibility of the fur tearing away in any case.

Having thus described my invention, what I claim as new, and desire to secure by Letters Patent, is—

A duster made of the tail of an animal mounted upon a suitable handle, which forms a core within it, and to which it is secured by means of a band or ferrule, substantially as described.

In testimony that I claim the foregoing I have hereunto affixed my signature in the presence of two witnesses.

LAÛRITZ HOBOLTH.

Witnesses:
    HENRY FRANCIS QUELCH,
    ARTHUR HITCHINGS CHAMBERS.